(No Model.)

G. W. FITTS.
SEPARATING AND AMALGAMATING APPARATUS.

No. 550,608. Patented Dec. 3, 1895.

Witnesses
Inventor
By his Attorney George W. Fitts

UNITED STATES PATENT OFFICE.

GEORGE W. FITTS, OF COLORADO SPRINGS, COLORADO.

SEPARATING AND AMALGAMATING APPARATUS.

SPECIFICATION forming part of Letters Patent No. 550,608, dated December 3, 1895.

Application filed September 6, 1895. Serial No. 561,636. (No model.)

*To all whom it may concern:*

Be it known that I, GEORGE W. FITTS, a citizen of the United States of America, residing at Colorado Springs, in the county of El Paso and State of Colorado, have invented certain new and useful Improvements in Separating and Amalgamating Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in separating and amalgamating apparatus; and my object is to save the fine float or flour gold and silver.

It is well known that in some of the richest placer ground the mineral is so fine as to be held in suspension by the water, and therefore cannot be saved by the ordinary gravity process, since it will not settle by its own gravity. The affinity or mutual attraction existing between mercury and gold and silver when brought in contact is also well understood. Furthermore, the mercury being of much greater specific gravity than the water and sand or gangue of the pulp, it is very easy to separate the mercury from the gangue. In my improved apparatus I make use of these two principles. I force the sand or water containing the fine mineral through a body of mercury. I thus bring every particle of mineral in contact with the mercury, which unites therewith, forming an amalgam, while the gangue and water are forced out of a vertical discharge-pipe, and thus separated from the amalgam, which maintains its position by force of its greater gravity.

Having thus outlined the construction of the apparatus and the principles utilized in its operation, I will proceed to describe the same in detail, reference being made to the accompanying drawings, in which—

Figure 1:
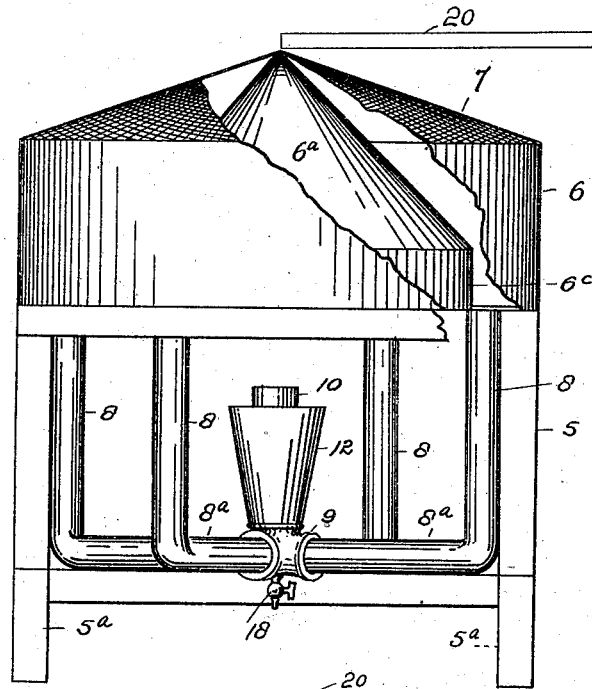
Figure 2:
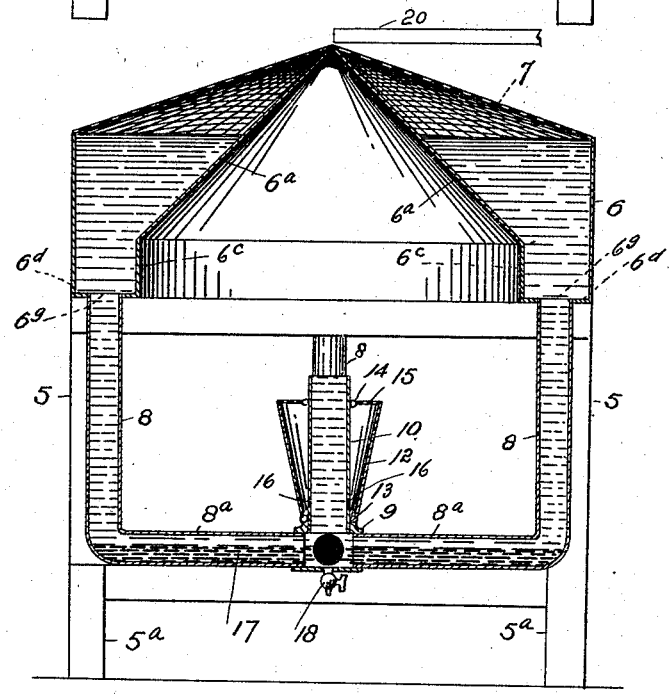

Figure 1 is a side elevation of the apparatus with parts broken away to facilitate clearness of illustration. Fig. 2 is a vertical section taken through the apparatus.

Similar reference characters indicate corresponding parts in the views.

Let the numeral 5 designate a suitable frame, from which project the short legs $5^a$. Upon this frame is mounted a tank 6, whose top is covered by a conical screen 7. Below the screen 7 is the conical inner wall or roof $6^a$, which rests upon a short vertical wall $6^c$, which is parallel with the outer wall of the tank. The outer and inner vertical walls of the tank are connected by a horizontal bottom $6^d$, in which are formed apertures $6^g$, from which lead vertical pipes 8. As shown in the drawings, there are four of these vertical pipes, whose lower extremities are connected with horizontal pipes $8^a$, which are carried diagonally inward toward a point directly beneath the apex of the conical wall $6^a$. These horizontal pipe-sections $8^a$ are connected at their inner extremities with a four-way fitting or coupling, to the top of which is attached a short vertical discharge-pipe 10, surrounded by a funnel-shaped receptacle 12, to which are attached two rings 13 and 14, adapted to fit the pipe. The top of the receptacle 12, which is largest, is covered by a screen 15 of any suitable mesh. The function of this receptacle is to prevent the loss of mercury in case any should be carried out of the discharge-pipe. Hence at the bottom of the receptacle the pipe is provided with one or more apertures 16 to allow all of the mercury caught by the receptacle to run back into the coupling 9, communicating with the pipe-sections $8^a$, which normally contain a suitable quantity of mercury, which is designated by the numeral 17.

This apparatus is designed for treating either placer diggings or pulverized ore containing free mineral. The material is discharged in the form of pulp upon the screen 7, which is of such mesh as to reject the coarser portion of the gangue. The balance of the material is carried with the water through the screen and falls upon the conical wall $6^a$, whence it passes to the horizontal bottom $6^d$ of the tank, thence downwardly through the pipes 8 and inwardly through the sections $8^a$, containing the mercury, with which the pulp is thoroughly mingled. While passing through the mercury-containing pipe-sections $8^a$ the pulp is impoverished of its gold and silver, which is taken up or absorbed by the mercury in the manner heretofore explained. The gangue is carried thence by the water-pressure resulting from the depth of the tank and the length of the pipes 8 upward through and out of the discharge-pipe 10, whose upper extremity is open. The height of the discharge-pipe is so regulated with reference to the gravity of the pressure-head that the force will be sufficient to carry the gangue over the top of the discharge-pipe. Care must be taken, however, that this pressure is not sufficient to force the mercury and amalgam over the top of the discharge-pipe. The specific gravity of the mercury, however, is so great as compared with the gangue that there will be no difficulty, on properly regulating the pressure, to accomplish the end sought. If any mercury or amalgam should be carried over the top of the discharge-pipe, it will fall upon the screen 15 of the receptacle 12 and pass thence to the bottom of said receptacle 12 and back into the mercury-pipes *via* the apertures 6$^g$.

The amalgam may be removed from the pipe-sections 8$^a$ through the instrumentality of a draw-off cock 18, connected with an opening formed in the bottom of the coupling 9.

The numeral 20 designates a trough, sluice, or other suitable conduit adapted to carry the material to the apparatus and discharge it upon the conical screen 7.

Having thus described my invention, what I claim is—

1. In an amalgamating and separating apparatus, the combination of a feed tank, a number of conduits leading downwardly therefrom, horizontal pipes forming a continuation of said conduits and containing a quantity of mercury a central, hollow coupling with which said horizontal pipes are connected, and a vertical discharge pipe also connected with said coupling, said discharge pipe being of less carrying capacity than the combined carrying capacity of all the inlet pipes, the height of the discharge pipe being regulated as described.

2. In a separating and amalgamating apparatus, the combination with a feed tank adapted to receive the material to be treated, of a conical screen covering said tank, a conical inner wall or roof below the screen and adapted to guide the material outward toward the circumference of the tank, outlet pipes extending downwardly from the tank, horizontal pipes connected with said outlet pipes, the horizontal pipes containing a quantity of mercury, a vertical discharge pipe connected with all the horizontal pipes, a receptacle surrounding the discharge pipe, and a screen covering the said receptacle, the discharge pipe being provided with one or more apertures communicating with said receptacle, substantially as described.

3. In a separating and amalgamating apparatus, the combination of the feed tank, a conduit leading downwardly therefrom, a horizontal pipe connected with said conduit and containing mercury, a vertical discharge pipe connected with the mercury-containing pipe, and a funnel-shaped receptacle surrounding the discharge pipe, a screen covering said receptacle, the discharge pipe being provided with one or more apertures located at the bottom of the receptacle, as and for the purpose set forth.

In testimony whereof I affix my signature in the presence of two witnesses.

GEORGE W. FITTS.

Witnesses:
CHAS. E. DAWSON,
ALFRED J. O'BRIEN.